United States Patent
Kawaida

(10) Patent No.: US 10,350,844 B2
(45) Date of Patent: Jul. 16, 2019

(54) GREEN TIRE SUPPORT DEVICE AND METHOD OF REMOVING DRUM FROM GREEN TIRE

(71) Applicant: BRIDGESTONE CORPORATION, Tokyo (JP)

(72) Inventor: Shinji Kawaida, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 306 days.

(21) Appl. No.: 14/655,891

(22) PCT Filed: Jan. 31, 2014

(86) PCT No.: PCT/JP2014/000532
§ 371 (c)(1),
(2) Date: Jun. 26, 2015

(87) PCT Pub. No.: WO2014/119337
PCT Pub. Date: Aug. 7, 2014

(65) Prior Publication Data
US 2015/0343727 A1    Dec. 3, 2015

(30) Foreign Application Priority Data
Feb. 1, 2013 (JP) ................. 2013-018265

(51) Int. Cl.
*B29D 30/00* (2006.01)
*B60B 30/02* (2006.01)
(Continued)

(52) U.S. Cl.
CPC ......... *B29D 30/0016* (2013.01); *B29D 30/26* (2013.01); *B60B 30/02* (2013.01); *B60B 31/00* (2013.01); *B29D 2030/0022* (2013.01)

(58) Field of Classification Search
CPC ............... B29D 30/0016; B29D 30/26; B29D 30/2607; B29D 2030/0022
See application file for complete search history.

(56) References Cited

U.S. PATENT DOCUMENTS 3,830,388 A * 8/1974 Mott .................... B60B 29/002
414/427
4,093,495 A * 6/1978 Colombani ........ B29D 30/2607
156/126
(Continued)

FOREIGN PATENT DOCUMENTS

CN    201333808 Y    10/2009
CN    101672121 A    3/2010
(Continued)

OTHER PUBLICATIONS

Machine generated English language translation of JP 59-62134 (original document dated Apr. 1984).*
(Continued)

*Primary Examiner* — Timothy Kennedy
(74) *Attorney, Agent, or Firm* — Oliff PLC

(57) ABSTRACT

A green tire support device includes: a green tire support which supports a green tire; a lift which moves the green tire support up and down; and an actuator which moves the green tire support away from or closer to a drum along an axial direction of the drum, to remove the drum from the green tire.

6 Claims, 3 Drawing Sheets

(51) Int. Cl.
  *B60B 31/00* (2006.01)
  *B29D 30/26* (2006.01)

(56) References Cited

U.S. PATENT DOCUMENTS

| | | | | |
|---|---|---|---|---|
| 4,473,427 | A | | 9/1984 | Irie |
| 4,726,861 | A | * | 2/1988 | Vorih ..................... B29D 30/20 156/131 |
| 6,382,644 | B1 | * | 5/2002 | Rawlings .............. B60B 29/002 280/47.35 |
| 2004/0051056 | A1 | * | 3/2004 | Disabito ................. A61L 9/015 250/504 R |
| 2008/0122192 | A1 | * | 5/2008 | Goodman ................ B62B 1/14 280/47.371 |
| 2008/0253834 | A1 | * | 10/2008 | Colvard ............... E01C 19/006 404/84.05 |
| 2009/0162180 | A1 | * | 6/2009 | Currie ............... B29D 30/0016 414/754 |
| 2011/0232830 | A1 | * | 9/2011 | Rey ........................ B29D 30/16 156/111 |
| 2012/0145328 | A1 | * | 6/2012 | Stoila ................. B29D 30/2607 156/394.1 |
| 2012/0318458 | A1 | * | 12/2012 | Araki ................. B29D 30/2607 156/378 |

FOREIGN PATENT DOCUMENTS

| | | | | |
|---|---|---|---|---|
| JP | S57-205131 | A | | 12/1982 |
| JP | 59-62134 | | * | 4/1984 ............. B29H 17/00 |
| JP | S59-62134 | A | | 4/1984 |
| JP | S63-197273 | U | | 12/1988 |
| JP | H01-190438 | A | | 7/1989 |
| JP | 06-286016 | | * | 10/1994 ............. B29D 30/08 |
| JP | 10-16084 | | * | 1/1998 ............. B29D 30/26 |
| JP | 11-79334 | | * | 3/1999 ............... B65G 7/08 |
| JP | H11-079334 | A | | 3/1999 |
| JP | 2004-136607 | A | | 5/2004 |
| JP | 2005-246890 | A | | 9/2005 |
| SU | 429968 | | * | 5/1974 ............. B29D 30/26 |

OTHER PUBLICATIONS

Machine generated English language translation of JP 10-16084 (original document dated Jan. 1998).*
Machine generated English language translation of SU 429968 (original document dated May 1974) (Year: 1974).*
Machine generated English language translation of JP 11-79334 (original document dated Mar. 1999) (Year: 1999).*
Machine generated English language translation of JP 06-286016 (original document dated Oct. 1994) (Year: 1994).*
Mar. 4, 2014 International Search Report issued in International Application No. PCT/JP2014/000532.

* cited by examiner

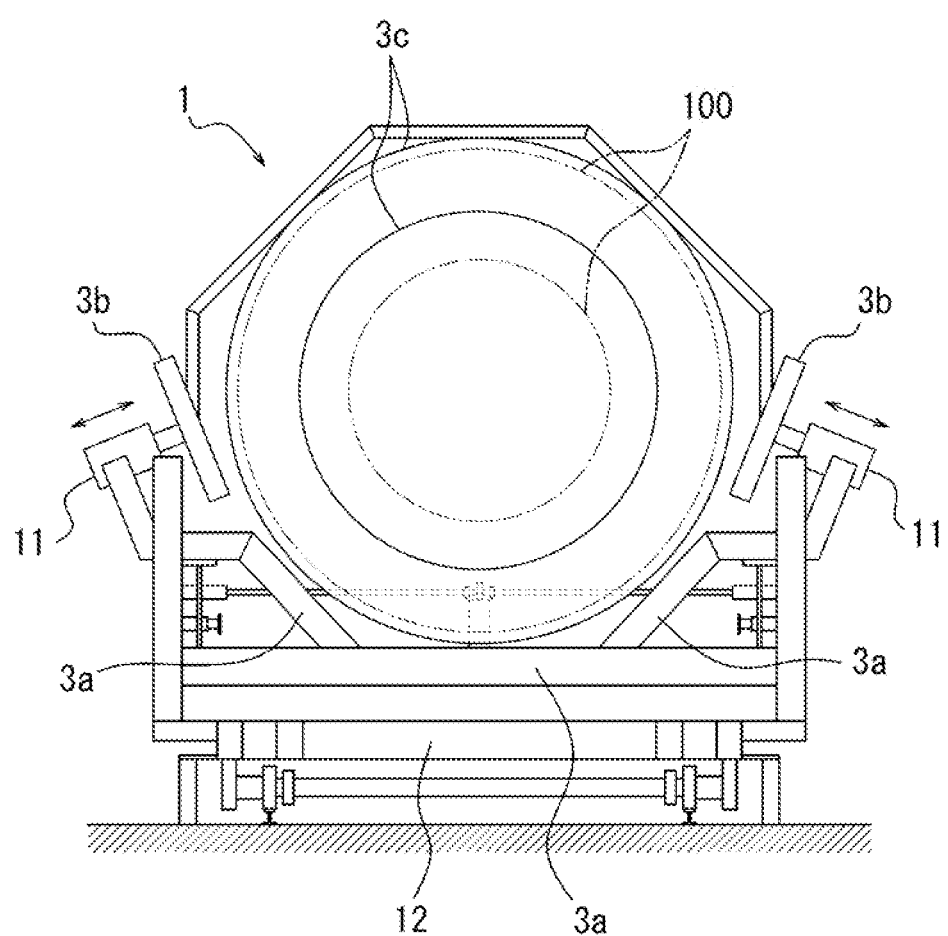

GREEN TIRE SUPPORT DEVICE AND METHOD OF REMOVING DRUM FROM GREEN TIRE

TECHNICAL FIELD

The disclosure relates to a green tire support device and a method of removing a drum from a green tire.

BACKGROUND

When molding a green tire, typically, tire structural members such as a bead core, a carcass, and a sidewall rubber are attached onto a drum to form a raw case, and a tread rubber and the like are arranged on the outer surface of the raw case. This green tire is put in a mold and subjected to vulcanization molding, as a result of which a product tire is obtained.

Before the vulcanization molding of the green tire, the drum needs to be removed from the green tire. Especially when manufacturing a large tire such as a tire for a construction vehicle, this removal operation is performed by winding, a string-like tire suspension member around the green tire as in Patent Literature (PTL) 1 in the state where the drum is supported and operating the green tire with a crane or the like.

However, the above-mentioned operation of moving the large green tire with the crane and, while suspending the green tire with the crane and the tire suspension member, regulating the crane to remove the drum from the green tire is not easy and requires proficiency.

Since it is difficult to accurately move the green tire with the crane to remove the drum, there is a possibility that the bead portion of the green tire is caught in the drum and damaged during the drum removal operation.

There is also a possibility that, when moving the green tire, the tire suspension member and the tread surface of the green tire rub against each other and as a result the tread surface of the green tire is damaged or deformed.

CITATION LIST

Patent Literature

PTL 1: JP S63-197273 U

SUMMARY

Technical Problem

It could therefore be helpful to provide a green tire support device and a method of removing a drum from a green tire that ease the operation of removing the drum from the green tire and effectively prevent damage to the bead portion or tread surface of the green tire during the operation.

Solution to Problem

The disclosed green tire support device includes: a green tire support which supports a green tire; a lift which moves the green tire support up and down; and an actuator which moves the green tire support away from or closer to a drum along an axial direction of the drum, to remove the drum from the green tire.

The disclosed method of removing a drum from a green tire is a method of removing a drum, which is attached to a bead portion of a large green tire, from the green tire using the above-mentioned green tire support device, the method including: supporting the green tire by the green tire support; detaching the drum and the bead portion of the green tire from each other; moving the green tire support up and down by the lift, to cause a center axis of the drum and a center axis of the bead portion of the green tire to substantially coincide with each other and moving the green tire support away from the drum by the actuator, to remove the drum attached to the bead portion of the green tire from the green tire.

Advantageous Effect

It is possible to ease the operation of removing the drum from the green tire and effectively prevent damage to the bead portion or tread surface of the green tire during the operation.

BRIEF DESCRIPTION OF THE DRAWINGS

In the accompanying drawings:

FIG. 2 is a front view illustrating a green tire support of the green tire support device according to the embodiment illustrated in FIG. 1.

DETAILED DESCRIPTION

The following describes an embodiment with reference to drawings.

Figure 1:
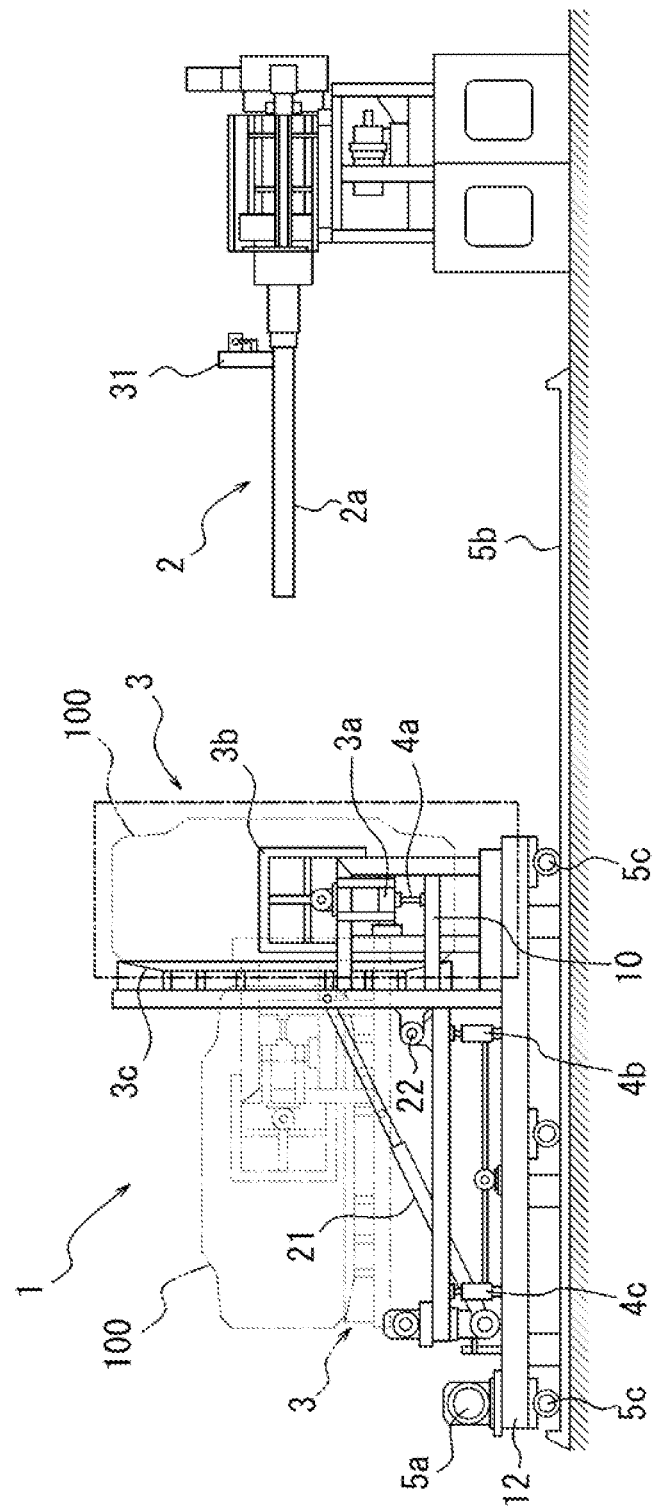
FIG. 1 is a side view illustrating an embodiment of a green tire support device.

A green tire support device 1 according to the embodiment illustrated in FIG. 1 supports a green tire immediately after molding with its rotational axis being horizontal, removes a drum that has been attached to the green tire during the molding, and then tilts the green tire so that the rotational axis is vertical in order to subject the green tire to vulcanization molding that is typically performed in the state in which the rotational axis is vertical. The green tire support device 1 is particularly suitable for supporting a large green tire such as a tire for a construction vehicle.

The green tire support device 1 illustrated in FIG. 1 includes: a drum support 2 which supports a drum attached to a head portion of a large green tire; a green tire support 3 which supports the green tire; a lift which moves the green tire support 3 up and down relative to the drum support 2, which includes jacks (bottom supporting portion driving members) 4b and 4c in this embodiment; and a actuator which drives the green tire support 3 substantially horizontally relative to the drum support 2 in order to remove the green tire from the drum, which includes a servomotor 5a, a rail 5b, and wheels 5c in this embodiment. With the green tire support device 1 in this embodiment, the operation of removing the drum from the green tire can be eased. Moreover, damage to the bead portion of the green tire caused by the bead portion being caught in the drum during the removal operation can be effectively prevented. Further, since no tire suspension member is used to move the green tire unlike in the conventional technique, damage to the tread surface of the green tire can be effectively prevented.

Figure 3A:
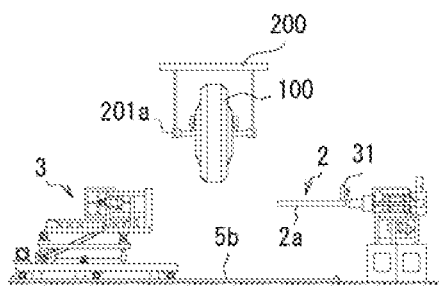
FIGS. 3A-3H are diagrams illustrating an embodiment of a method of removing a drum from a green tire.

The drum support 2 which supports the drum attached to the bead portion of the large green tire includes: a shaft 2a in which a drum cylindrical portion 201a illustrated in FIG. 3A is inserted and that extends substantially horizontally; a pin 31 for securing the drum cylindrical portion 201a near the base of the shaft 2a; and an air piping (not illustrated) that is connected to the drum to deflate the green tire 100.

The shaft 2a is rotatable about its axis by a servomotor (not illustrated). By rotating the shaft 2a when removing the drum from the green tire 100, the drum connected to the shaft 2a can be removed while being rotated. Thus, even if the bead portion of the green tire 100 and the drum come into contact with each other, the bead portion is kept from being caught in the drum, so that damage to the bead portion can be effectively prevented.

The green tire support 3 supports the green tire with its rotational axis being horizontal. The green tire supported by the green tire support 3 is indicated by imaginary line 100 in FIGS. 1 and 2. The green tire support 3 includes a holding unit including a bottom supporting portion 3a which supports the tread of the green tire when the green tire support 3 is in the upright position. In this embodiment, the holding unit also includes a side supporting portion 3b which supports the green tire laterally other than from top or bottom when the green tire support 3 is in the upright position. The green tire support 3 is connected to a frame 10 so as to be movable up and down, and the frame 10 is connected to a carriage 12 so as to be movable up and down.

In this embodiment, the side supporting portion 3b of the green tire support 3 is driven by a cylinder (a side supporting portion driving member) 11 in a substantially radial direction of the green tire 100, as illustrated in FIG. 2. This enables the green tire 100 to be held from three directions by the bottom supporting portion 3a and the pair of side supporting portions 3b. Thus, in the upright position in which the axis of the green tire is horizontal (the green tire is standing upright on its tread), the green tire 100 which is circular as seen from the axial direction of the green tire can be effectively prevented from deforming under its own weight into an ellipse whose minor axis is vertical. This eases the drum removal operation, and improves the quality of the tire manufactured. In addition, since the side supporting portion 3b can be expanded or contracted in the substantially tire radial direction, the green tire support device 1 can support the green tire 100 of any of various diameters.

A back supporting portion 3c is a toroidal plate, as illustrated in FIG. 2. The bead portion of the green tire 100 contains heavy steel cords and the like and so tends to deform under its own weight. By supporting a side portion on one side of the green tire 100 in the axial direction by the back supporting portion 3c, however, the deformation of the bead portion or the deformation of the green tire under its own weight can be effectively suppressed.

In this specification, the upright position of the green tire support means the position when the green tire support supports the green tire so that the center axis of the green tire is substantially horizontal, and the horizontal position of the green tire support means the position when the green tire support supports the green tire so that the center axis of the green tire is substantially vertical.

A jack 4a moves the bottom supporting portion 3a of the green tire support 3 up and down relative to the frame 10. The lift includes the jacks 4b and 4c which moves the frame 10 up and down relative to the carriage 12. When the jacks 4b and 4c move the frame 10 up and down, the green tire support 3 connected to the frame 10 is moved up and down together with the frame 10.

By moving the bottom supporting portion 3a of the green tire support 3 up and down by the jack (the bottom supporting portion driving member) 4a according to the diameter of the green tire 100, the green tire 100 is supported by the bottom supporting, portion 3a of the green tire support 3, thus preventing an overload between the bead portion of the green tire 100 and the drum and also keeping the green tire from deforming under its own weight. This eases the drum removal operation, and improves the quality of the tire manufactured.

When removing the drum from the green tire, the frame 10 and the green tire support 3 are moved up and down by the jacks 4b and 4c to perform centering between the drum and the green tire (cause their center axes to substantially coincide with each other). In this way, clearance is created between the drum and the bead portion of the green tire, as a result of which damage to the bead portion of the green tire can be effectively prevented.

When removing the green tire 100 from the drum, the bead portion of the green tire 100 deforms under its own weight. Such deformation is particularly noticeable in manufacture of heavy load tires or the like. The deformation may make it difficult to remove the green tire 100 from the drum. To overcome this problem, for example, the lifting quantities of the jacks 4a, 4b, and/or 4c according to the tire size are determined beforehand and, when removing the green tire 100 from the drum, the jacks 4a, 4b, and/or 4c are moved up and down by the lifting quantities. This eases the removal of the green tire 100 from the drum, which has been difficult due to the deformation of the bead portion under its own weight.

Although three jacks are provided in this embodiment, the number of jacks may be one, two, or four or more. The jacks 4a to 4c may each be a cylinder or the like, as long as they enable movement up and down. Furthermore, the drum support 2 may be moved up and down relative to the green tire support 3.

The actuator is used when removing the drum from the green tire 100, and includes the servomotor 5a, the rail 5b, and the wheels 5c. By driving the wheels 5c by the servomotor 5a, the carriage 12, the frame 10, and the green tire support 3 can be driven horizontally along the rail 5b.

The rail 5b has grooves at fixed intervals. This prevents the carriage 12 from moving as a reaction when the below-mentioned position changing unit is operated.

The actuator may have the following structure: a servomotor and wheels are provided for the drum support 2 and the drum support 2 is driven along a rail, thus driving the drum support 2 relative to the green tire support 3.

The green tire support device 1 in this embodiment includes the position changing unit including a cylinder 21 which is an air cylinder in this embodiment. The cylinder 21 has one end fixed to the frame 10, and the other end fixed to the carriage 12. In the case where the cylinder 21 is extended as in FIG. 1, the green tire support 3 is in the upright position in which the rotational axis of the supported green tire is horizontal. By shortening the cylinder 21, the position of the green tire support 3 can be changed from the upright position to the horizontal position in which the rotational axis of the supported green tire is vertical as indicated by the imaginary line in FIG. 1.

The green tire support device 1 thus includes the position changing unit including the cylinder 21 which changes the position of the green tire support 3 from the upright position to the horizontal position. With this structure, the operation of changing the large green tire from the upright state to the horizontal state can be performed easily, and the green tire can be easily conveyed to undergo the next vulcanization step. In addition, the green tire can be easily tilted from the state in which the rotational axis of the green tire is horizontal to the state in which the rotational axis of the green tire is vertical, unlike in the conventional case of using the tire suspension member. Hence, the tread surface of the green tire can be effectively prevented from being rubbed and as a result damaged or deformed.

Moreover, in the green tire support device 1 in this embodiment, a conveyer can be realized by driving the wheels 5c by the servomotor 5a in the state where the wheels 5c are removed from the rail 5b. With such conveyer including the servomotor 5a and the wheels 5c, the green tire 100 supported by the green tire support 3 can be easily conveyed to the next step, e.g. the vulcanization step.

The following describes an example of the method of supporting the green tire conveyed from the previous step, removing the drum attached to the green tire, tilting the green tire, and then conveying the green tire to the location of the next step using the above-mentioned green tire support device 1, with reference to FIGS. 3A-3H.

Prior to this operation, the green tire support 3 is moved sufficiently away from the drum support 2 by the servomotor 5a, and preferably the bottom supporting portion 3a of the green tire support 3 is sufficiently lowered by the jack 4a, the cylinder 21 is contracted, and the pair of side supporting portions 3b of the green tire support 3 are set to have the maximum diameter.

The drum (a drum 201 in FIG. 3E, etc.) is attached to the bead portion of the green tire 100 conveyed from the previous step. Both ends of the drum cylindrical portion 201a are supported by a crane 200 as in FIG. 3A, and the drum cylindrical portion 201a is inserted into the shaft 2a of the drum support 2 as in FIG. 3B. After the insertion, the drum cylindrical portion 201a is secured to the shaft 2a by the pin 31. This enables the drum support 2 to support the drum 201.

Figure 3E:
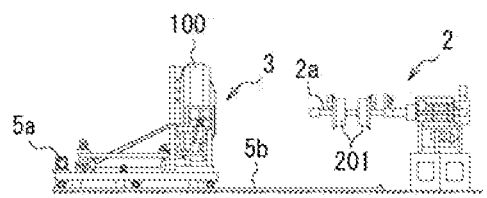
Figure 3B:
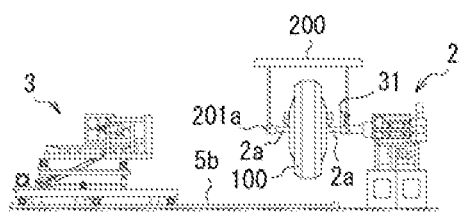
Figure 3F:
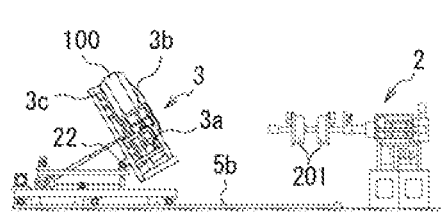
Figure 3C:
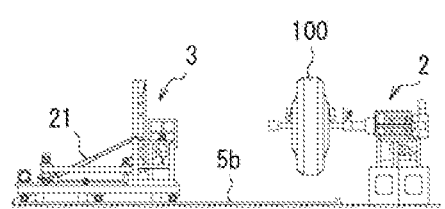
Figure 3G:
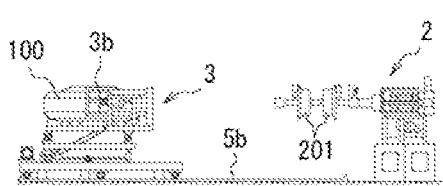
Figure 3D:
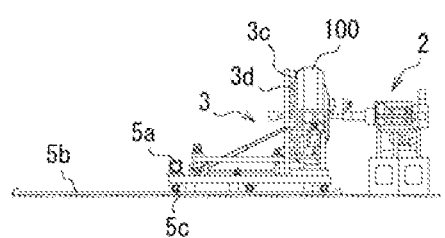
Figure 3H:
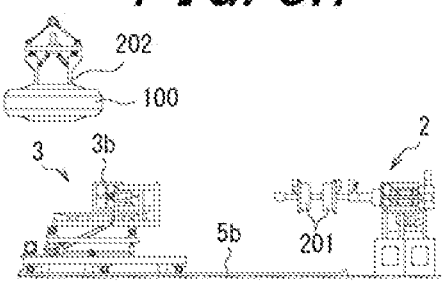

Following this, the cylinder 21 is extended to set the green tire support 3 in the upright position as in FIG. 3C. The wheels 5c are then driven by the servomotor 5a to move the green tire support 3 closer to the drum support 2 so that the back supporting portion 3c of the green tire support 3 supports the green tire 100, as in FIG. 3D.

After this, the bottom supporting portion 3a of the green tire support 3 is moved up by the jack 4a illustrated in FIG. 1 so that the bottom supporting portion 3a of the green tire support 3 supports the green tire 100. The pair of side supporting portions 3b of the green tire support 3 are moved in the radial inward direction of the green tire 100 by the respective two cylinders 11 illustrated in FIG. 2, thereby holding the green tire 100 from three directions by the bottom supporting portion 3a and the pair of side supporting portions 3b. The driving quantities of the jack 4a and cylinders 11 are regulated to suppress a large force acting between the bead portion of the green tire 100 and the drum. Thus, the green tire 100 is held by the bottom supporting portion 3a and the pair of side supporting portions 3b by expanding or contracting the bottom supporting portion 3a and the side supporting portions 3b in the substantially radial direction of the green tire 100. This prevents the supported green tire 100 from deforming under its own weight, and also eases the operation of removing the drum 201 from the green tire 100 of any of various diameters.

In the case where the green tire 100 is large, the green tire tends to deform under its own weight. To suppress such deformation, the green tire 100 has been filled with air to a predetermined internal pressure, at least from the stage of conveyance from the previous step up to this point. Therefore, before detaching the drum and the bead portion of the green tire 100 from each other, the green tire 100 is deflated using the air piping of the drum support 2. The deflation operation can be performed in parallel with the operation of regulating the jack 4a and the cylinders 11 to hold the green tire 100.

After the green tire 100 is deflated, the drum is detached from the bead portion of the green tire 100, and the diameter of the drum 201 is reduced.

During this, the entire bead portion of the green tire 100 tends to fall downward under its own weight. Accordingly, the frame 10 and the green tire support 3 connected to the frame 10 are moved up by the jacks 4b and 4c to perform centering between the drum 201 and the head portion of the green tire 100.

The green tire support 3 is then moved away from the drum support 2 by the servomotor 5a while rotating the shaft 2a of the drum support 2, as in FIG. 3E.

By pulling out the drum in the rotational axis direction of the green tire 100 according to the above-mentioned method, the drum 201 can be easily removed from the green tire 100 and also the quality of the tire manufactured can be improved, without the bead portion of the green tire 100 being caught in the drum 201 and as a result the head portion or tread surface of the green tire 100 being damaged.

The molded green tire has its rotational axis horizontal. The vulcanization molding of the green tire is, on the other hand, performed in the state in which the rotational axis of the green tire is vertical. Hence, the green tire 100 is tilted from the state in which the rotational axis is horizontal into the state in which the rotational axis is vertical. In detail, the cylinder 21 is contracted to rotate and tilt the green tire support 3 about a rotary shaft 22 as in FIG. 3F, into the state in which the rotational axis of the green tire 100 is vertical as in FIG. 3G.

While tilting the green tire 100, too, the pair of side supporting portions 3b and bottom supporting portion 3a of the green tire support 3 hold the green tire 100 from three directions, and the back supporting portion 3c of the green tire support 3 supports the green tire 100. This prevents the deformation of the green tire 100 when tilting the green tire 100, as described above.

The cylinders 11 are then contracted to move the side supporting portions 3b of the green tire support 3 away from the green tire, thus releasing the green tire 100. After this, with the bead portion of the green tire 100 being held by, for example, a loading chuck 202, the green tire 100 can be taken out of the green tire support 3 as in FIG. 3H, and moved to the location of the next step, e.g. the vulcanization step, by a crane or the like.

Here, the carriage 12 may be moved by driving the wheels 5c by the servomotor 5a, to convey the green tire 100 to the next step.

REFERENCE SIGNS LIST 1 green tire support device
2 drum support
2a shaft
3 green tire support
3a bottom supporting portion (holding unit)
3b side supporting portion (holding unit)
3c back supporting portion (holding unit)
4a jack (bottom supporting portion driving member)
4b, 4c jack (lift)
5a servomotor (actuator, conveyer)
5b rail (actuator)
5c wheel (actuator, conveyer)
10 frame
11 cylinder (side supporting portion driving member)

12 carriage
21 cylinder (position changing unit)
22 rotary shaft
31 pin
100 green tire
200 crane
201 drum
201a drum cylindrical portion
202 loading chuck

The invention claimed is:

1. A green tire support device comprising:
a drum support that is capable of supporting a drum that is capable of being attached to a bead portion of a green tire;
a green tire support that is capable of supporting the green tire;
a lift that is capable of moving the green tire support up and down;
an actuator that is capable of moving the green tire support away from or closer to the drum along an axial direction of the drum, to remove the drum from the green tire, wherein:
the green tire support includes a back supporting portion that is capable of supporting a side portion on one side of the green tire in an axial direction of the green tire, the back supporting portion being a toroidal plate, and
the drum support further comprises a rotor that is capable of rotating the green tire about an axis of the rotor; and
a controller that is configured, after the green tire is deflated when the drum is detached from the bead portion of the green tire and a diameter of the drum is reduced, to move the green tire support up and down by the lift with lifting quantities of the green tire support determined beforehand in accordance with a tire size.

2. The green tire support device according to claim 1, wherein the green tire support includes:
a holding unit including a bottom supporting portion that is capable of supporting a tread of the green tire when the green tire support is in an upright position in which the green tire is standing upright on the tread; and
a bottom supporting portion lift that is capable of driving the bottom supporting portion of the holding unit in a substantially radial direction of the supported green tire.

3. The green tire support device according to claim 2, wherein the holding unit includes a side supporting portion that is capable of supporting the green tire other than from top or bottom of the green tire when the green tire support is in the upright position.

4. The green tire support device according to claim 3, further comprising
a side supporting portion actuator that is capable of driving the side supporting portion of the holding unit in a substantially radial direction of the supported green tire.

5. The green tire support device according to claim 1, comprising
a position changing actuator that is capable of changing the position of the green tire support from an upright position to a horizontal position.

6. The green tire support device according to claim 1, comprising
a conveyer that is capable of conveying the green tire.

* * * * *